June 3, 1924. Re. 15,852
J. A. RENSTROM
INDICATING DEVICE FOR LUBRICATORS
Original Filed April 21, 1922
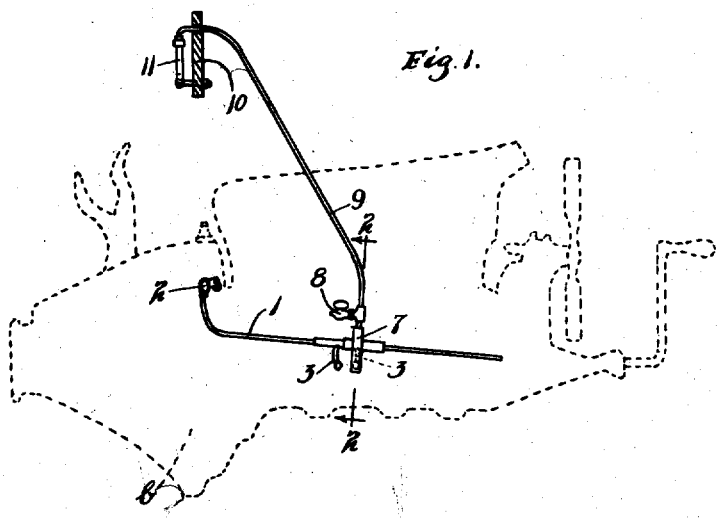
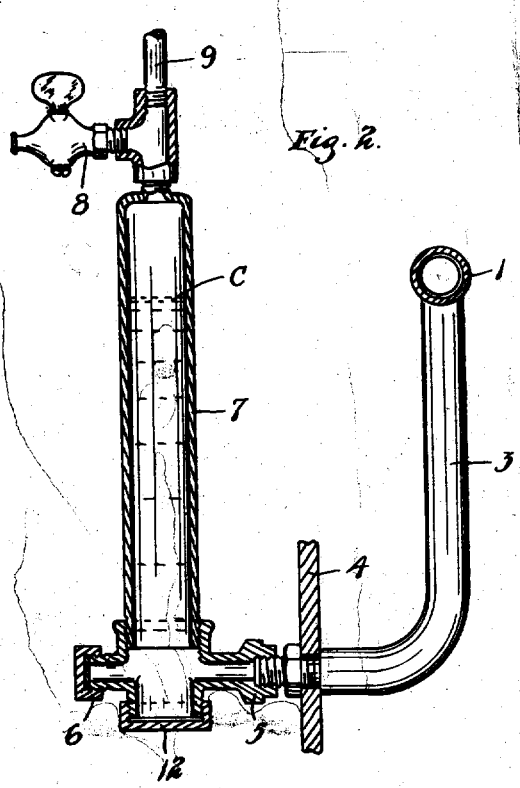
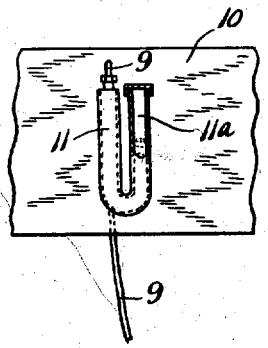
INVENTOR.
JOHN A. RENSTROM.
BY HIS ATTORNEY.
James F. Williamson Reissued June 3, 1924.

Re. 15,852

UNITED STATES PATENT OFFICE.

JOHN A. RENSTROM, OF MORA, MINNESOTA.

INDICATING DEVICE FOR LUBRICATORS.

Original No. 1,442,826, dated January 23, 1923, Serial No. 555,819, filed April 21, 1922. Application for reissue filed March 13, 1924. Serial No. 699,070.

*To all whom it may concern:*

Be it known that I, JOHN A. RENSTROM, a citizen of the United States, residing at Mora, in the county of Kanabec and State of Minnesota, have invented certain new and useful Improvements in Indicating Devices for Lubricators; and I do hereby declare the following to be a full, clear, and exact description of the invention, such as will enable others skilled in the art to which it appertains to make and use the same.

This invention relates to an automobile and particularly to an indicating device for indicating the flow of oil through the lubricating supply tube. In automobiles of the Ford type there is customarily provided a tube having an open receiving portion at one end adapted to receive oil thrown or splashed up by the moving members in the crank case. The oil flows by gravity through this tube and supplies a lubricating system.

It is an object of this invention to provide a gauge or indicating means disposed on the dash of the automobile or within convenient sight of the driver for indicating when oil is flowing through the said supply tube.

It is a further object of the invention to provide such an indicating means in connection with a clean-out arm or device applied to said tube.

It is still another object of the invention to provide such an indicating device comprising an oil container in which the level of the oil is adapted to be varied and which container is connected to an air displacement gauge by a small tube.

These and other objects and advantages of the invention will be fully set forth in the following description made in connection with the accompanying drawings in which like reference characters refer to the same parts throughout the different views, and in which, Fig. 1 is a view in side elevation of the device showing parts of the engine and crank case of the automobile in dotted lines;

Fig. 2 is a view in vertical section taken substantially on the line 2—2 of Fig. 1; and Fig. 3 is a view in front elevation partly in section of the gauge, the same being shown on an enlarged scale.

The present application is in one sense a development and improvement of the invention disclosed in U. S. Letters Patent granted January 23, 1923, No. 1,442,825.

Referring to the drawings, in Fig. 1, the dotted lines indicate certain parts of an automobile engine of the type used in a well known Ford automobile including a crank case *b*. In such automobiles the tube 1 is provided having an open receiving member 2 at its rear end adapted to receive oil therefrom, or splashed up by the moving parts in the crank case. The oil travels downwardly and forwardly in the tube and is discharged to lubricate certain parts of the gearing. In the prior patent, above referred to, a structure of tube is disclosed comprising certain clean-out arms 3 which depend from the tube 1 and project laterally through the wall 4 of the crank case, in which they are secured by suitable check nuts. In accordance with this invention, the member 5, preferably in the shape of a cross-T is provided and one of its arms is connected to one of the arms 3. The arm in alinement with this connected arm is closed by a cap 6. One of the arms of the T is arranged to project upwardly and a pipe or container 7 is screwed into this arm. A T carrying a pet cock 8 is connected above the member 7 and a tube 9 connected to said T extends upwardly to the vicinity of the dash 10 of the automobile where it is connected to one arm of an air displacement gauge 11 shown as formed of a U-tube having an air vent at the top of one of its legs and adapted to contain a suitable liquid, such as water or oil. One arm of the member 5 is arranged in depending relation and closed by a cap member 12.

When the oil is flowing through the tube 1 the arms 3 will always be filled with oil and this oil will, according to the well known law of liquids, fill the pipe or container 7 to substantially the level of the oil in the arm 3. If no oil is flowing in the tube 1, the oil will, of course, be retained in the arm 3 and the level of the oil in the container 7 will be substantially even with the top of the arm 3, as indicated by the dotted line *c*. When oil flows through the tube 1, the level of the oil in the container 7 will rise to somewhat greater height either at or above the top of the tube 1 at the point where it is connected to the arms 3. This rise of the oil in the container 7 will displace the air in said container, which air will be moved into the tube 9 and the column of air therein will be moved along into one end of the gauge 11 and will displace the liquid in said gauge so that the same will stand higher in one of the arms than in the other. The liquid in the arms 11ª of the gauge 11 will indicate the level of the oil in the container 7 and will thus indicate whether or not oil is flowing through the tube 1. In the actual use of the device it has also been found that after the oil has been used a long time the same becomes very thin and is of small lubricating value. At such time, the level of the oil in the tube 7 will be lowered even though oil is traveling through the pipe or tube 1 and the indicating device will thus indicate that the oil is becoming too thin for use. The arms 3 and tube 1 can be cleaned, as usual, by removing the cap 6 and inserting a flexible cleaning element through the member 5 and into the arms 3 and hence, into one portion of the tube 1. The other arm 3 is used to clean out the other parts of the tube 1, the arms curving toward the respective ends or portions of the tube to guide the cleaning implement into said portions, respectively. The arms of the cross-T at the bottom of member 5 will act as a sediment receptacle and will assist in keeping the passage to the container 7 open. If the use of the gauge is not desired, the pet cock 8 can be opened to afford a communication from the interior of the container 7 to the atmosphere and the gauge 11 will thus not be operated.

From the above description it is seen that applicant has provided a simple and efficient means for indicating when the oil is passing through the oil supply tube 1, which means is also adapted to afford a clean-out opening for the tube. The parts of the device are simple and can be inexpensively made from standard material and easily and quickly attached to a standard automobile of the Ford or similar type.

It will, of course, be understood that various changes may be made in the form, details and arrangement of the parts without departing from the scope of applicant's invention, which, generally stated, consists in the matter shown and described and set forth in the appended claims.

What is claimed is:

1. In combination with an automobile having a lubricating tube supplied with oil from the crank case of the engine, an indicating device for indicating the flow of oil through said tube, comprising a conduit depending from said tube, an upstanding oil container connected to the lower end thereof, a tube connected to the top of said container, and a liquid-containing air displacement gauge to which the other end of said last mentioned tube is connected, whereby a change of level of oil in said container will displace the liquid in the said gauge.

2. In combination with an automobile of the Ford type having a lubricating oil supply tube receiving oil from the crank case, a device for indicating the flow of oil through said tube, comprising a clean-out arm connected to said tube, a T connected to said arm, an upstanding oil container connected to said T, a tube connected to the upper end of said container, and a liquid-containing U-tube to one side of which said last mentioned tube is also connected, said U-tube being disposed within convenient sight of the operator of the automobile.

3. The structure set forth in claim 2, the said T having a cap on its outer end adapted to be removed to provide a clean-out opening for said clean-out arm.

4. In combination with an automobile having a lubricating tube supplied with oil from the crank case of an engine, a device for indicating the flow of oil through said tube comprising a conduit depending from said tube and projecting outwardly and secured in the side of a crank casing, a member having a lateral opening therein, and an upstanding container thereon connected to said conduit, an air inlet valve connected above the said container, and a tube extending from said container to a gauge disposed adjacent the dash of the automobile.

5. In combination with a clean-out arm for the oil supply tube of an automobile of the Ford type, an indicating device comprising a connection to said arm, and an oil container upstanding therefrom, said connection having a cap covered opening adapted to receive a clean-out implement, and a tube extending upwardly from said container and connected to an air displacement gauge.

6. In combination with an automobile having a lubricating tube supplied with oil from the crank case of the engine, which tube is inclined downwardly along the side of said case, an indicating device for indicating the flow of oil through said tube comprising a conduit depending from said tube at an intermediate point thereof and extending outwardly therefrom, an upstanding oil container connected to the lower outer end of said conduit, a tube connected to the top of said container, and a liquid containing air displacement gauge disposed in view of the driver of the automobile to which the other end of said last mentioned tube is connected whereby a change of level of oil in said container will displace the liquid in said gauge.

7. In combination with an automobile having a lubricating tube supplied with oil from the crank case of the engine, an indicating device for indicating the flow of oil through said tube, comprising a conduit connected to said tube, an upstanding oil container connected to said conduit, a tube connected to the top of said container, and a liquid-containing air displacement gauge to which the other end of said last mentioned tube is connected, whereby a change of level of oil in said container will displace the liquid in the said gauge.

8. In combination with an automobile having a lubricating tube supplied with oil from the crank case of the engine, an indicating device for indicating the flow of oil through said tube, comprising an upstanding oil container connected to said tube, a tube having an end connected to the top of said container and a gauge to which the other end of said latter tube is connected adapted to be operated by the change of oil level in said container.

9. In combination with an automobile having a lubricating tube supplied with oil from the crank case of the engine, which tube is inclined downwardly along the side of said case, an indicating device for indicating the flow of oil through said tube comprising, an oil container connected at an intermediate point in said tube, a tube connected to the top of said container, and a liquid containing air displacement gauge disposed in view of the driver of the automobile to which the other end of said last mentioned tube is connected whereby a change of level of oil in said container will displace the liquid in said gauge.

In testimony whereof I affix my signature.

JOHN A. RENSTROM.